March 7, 1939.   R. H. BARNARD   2,150,017
METHOD OF AND APPARATUS FOR FORMING GLASS TUBES, RODS, AND THE LIKE
Original Filed Jan. 10, 1936   3 Sheets-Sheet 1
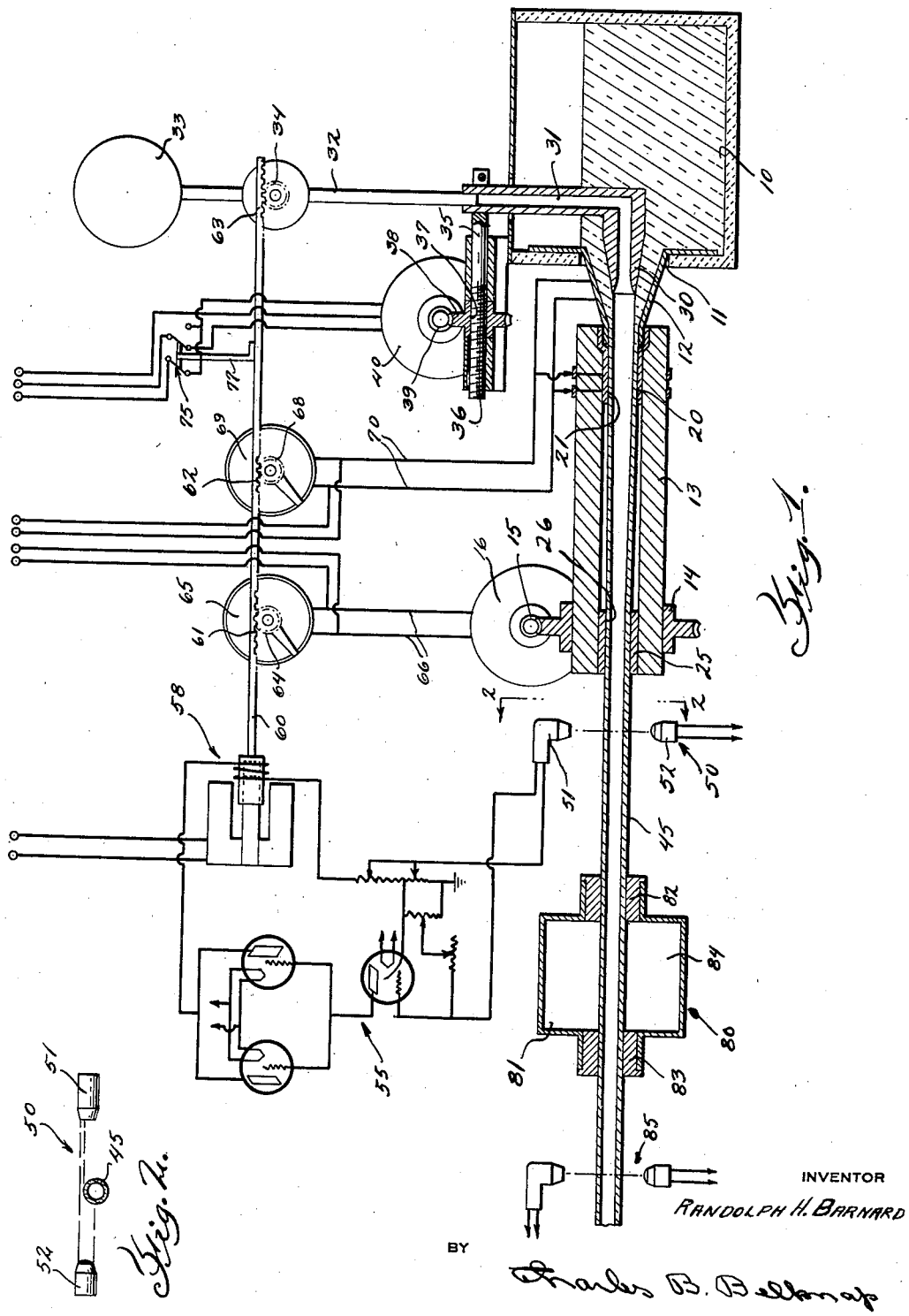
INVENTOR
RANDOLPH H. BARNARD
BY
Charles B. Belknap
ATTORNEY March 7, 1939.    R. H. BARNARD    2,150,017
METHOD OF AND APPARATUS FOR FORMING GLASS TUBES, RODS, AND THE LIKE
Original Filed Jan. 10, 1936    3 Sheets-Sheet 2

INVENTOR
RANDOLPH H. BARNARD
BY
Charles B. Belknap
ATTORNEY

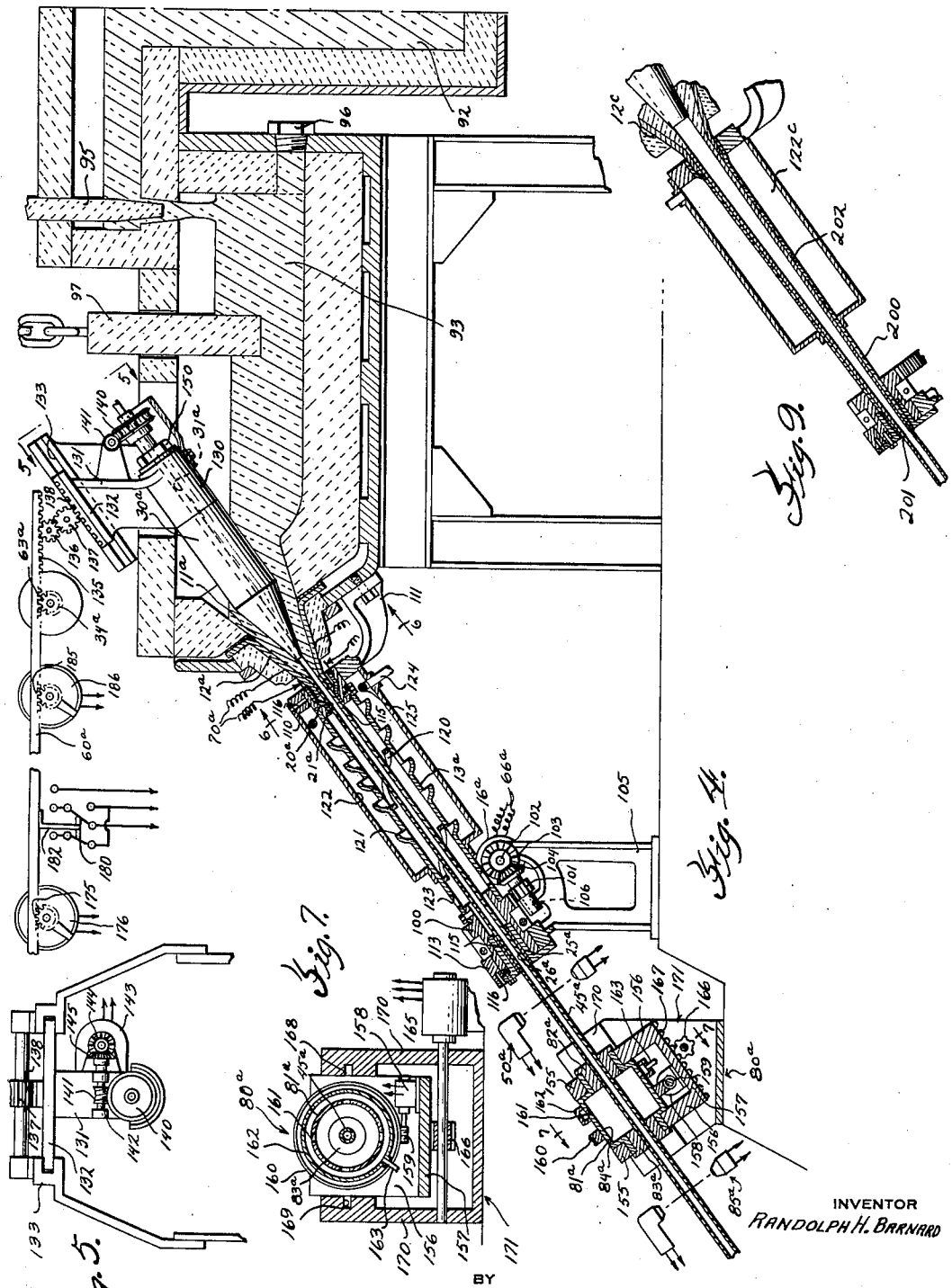

Patented Mar. 7, 1939

2,150,017

UNITED STATES PATENT OFFICE 2,150,017

METHOD OF AND APPARATUS FOR FORMING GLASS TUBES, RODS, AND THE LIKE

Randolph H. Barnard, Toledo, Ohio

Application January 10, 1936, Serial No. 58,443
Renewed January 31, 1938

17 Claims. (Cl. 49—17.1)

This invention relates generally to the manufacture of glass articles and has particular reference to a method and apparatus by which glass tubes, rods and the like may be conveniently produced.

One of the primary objects of this invention is to provide a method and apparatus by which tubes or rods of various sizes, and of various cross sectional shapes may be produced.

Additionally, the invention contemplates the provision of an apparatus in which the several shaping and sizing devices used for imparting the desired size and shape to the tubes or rods, may be readily removed and replaced by devices varying in size and shape so that the apparatus can be readily adapted to the forming of rods or tubing having any desired characteristics.

The invention has as a further object the provision in an apparatus of the above mentioned character, of means for automatically controlling the size of the tubing or rod being formed.

Still another object of the invention is to construct or cover the sizing and shaping bushings and the other portions of the apparatus which are contacted by the glass with a metal or an alloy which will resist erosion whereby the rod or tubing being formed will be maintained at the proper size.

The invention contemplates further an apparatus whereby tubes of different sizes may be simultaneously produced from a single glass reservoir or the like with the result that during a single day's operation tubes or rods of various sizes and shapes may be produced from the glass melted in a single furnace.

The above and numerous other objects and advantages of the invention will become more apparent as the following description proceeds, particularly when reference is had to the accompanying drawings wherein Fig. 1 is a highly diagrammatic view showing an apparatus constructed in accordance with the teachings of this invention;

Fig. 2 is a diagrammatic sectional view along the line 2—2 of Fig. 1;

Fig. 4 is a longitudinal sectional view taken substantially on the line 4—4 of Fig. 3;

Fig. 5 is a sectional view taken substantially on the line 5—5 of Fig. 4;

Fig. 7 is a fragmentary sectional view taken substantially on the line 7—7 of Fig. 4;

Fig. 9 is a fragmentary sectional view showing a slightly modified shaping and sizing device which may be utilized in the apparatus.

Figure 3:
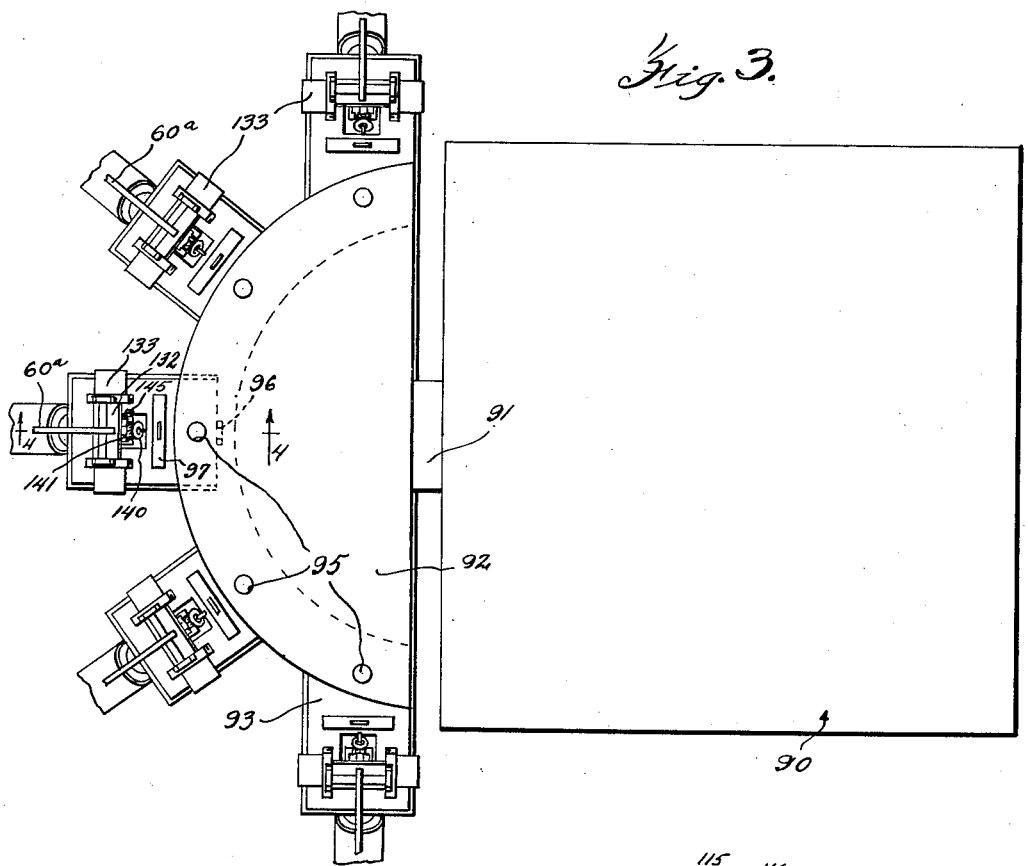
Fig. 3 is a diagrammatic plan view showing the manner in which a number of apparatuses slightly modified from that shown in Fig. 1 may be associated with a single forehearth.

Before proceeding with a description of the details of construction of the embodiment of the apparatus shown in the drawings, the general method will be first described, as will also the general features of one form of apparatus which may be conveniently utilized for carrying out the method.

Referring then to the drawings wherein like reference characters designate corresponding parts throughout all views, and referring more particularly to Fig. 1, the numeral 10 designates a feeding chamber from which the glass to be formed into tubes or rods is drawn. This feeding chamber is provided with an outlet 11 and associated with this outlet is an alloy bushing 12 having a tapered portion through which the glass passes to the shaping and sizing device about to be described.

The numeral 13 designates a sleeve which is mounted for rotation in suitable bearings (not shown). For rotating this sleeve there is fixed to the same a worm wheel 14 adapted to be driven by a worm 15 which in turn is driven by a suitable motor 16.

At its one end the sleeve 13 is provided with an alloy bushing 20 which assists in initially shaping the tubing or rod being formed. It is to be noted that the inlet end of the bushing 20 is enlarged and that it surrounds the tip end of the alloy bushing 12 thus preventing the seepage of glass during operation.

The initial shaping of the tubing or rod being formed is effected by the bushing 20 by virtue of the fact that the cross sectional shape of the passage 21 through this bushing corresponds to the shape desired in the finished product. Additionally, when round tubing or rod is being made and the sleeve 13 is rotated, the bushing 20 prevents the rod or tubing from buckling. The bushing 20 is so mounted within the sleeve 13 that it may be readily removed with the result that bushings of various cross sectional sizes and shapes may be substituted one for the other to form tubing or rods of various sizes and shapes.

At its opposite end the sleeve 13 is provided with a second alloy bushing 25, having a central passage 26, the cross sectional size and shape of which corresponds to the external size and shape desired in the tubing or rod being formed. Obviously, the cross sectional shape of the passage 26 corresponds to the cross sectional shape of the passage 21, while the cross sectional size of passage 26 is slightly smaller than the cross sectional size of passage 21. As will later be brought out, the sleeve 13 is provided with suitable means whereby air may be supplied to the interior of the same to properly control the temperature of the glass passing through this sleeve.

Projecting into the feeding chamber and so positioned as to discharge air into the passage 21 through the bushing 20, is a nozzle 30. This nozzle is of a shape corresponding to the cross sectional shape of the passage 21, but is of a size slightly smaller than the cross sectional area of the passage 21, the difference in size between the nozzle and the passage determining the thickness of the tubing wall when the tubing is being formed. This nozzle is likewise adapted to be readily replaced by a nozzle differing in size and shape to the end that when a change in the size or shape of the tubing being made is desired, a nozzle may be utilized which will correspond to the bushings 20 and 25 which are being utilized.

The nozzle or mandrel 30 controls the flow of glass through the bushing 12, and additionally this nozzle or mandrel is provided with a central air supply passage 31, which opens through the discharge end of the nozzle as clearly illustrated. Connected to the inlet end of the passage 31, is a flexible air supply conduit 32, and this conduit is in turn connected to a suitable source of air under pressure as for example, the compressed air tank 33. A valve (not shown) controlled by a pinion 34 is arranged to control the flow of air through the conduit 32 and thus the discharge of air from the nozzle 30.

The nozzle 30 is suitably mounted for movement toward and away from the inlet end of the bushing 20 and it is a feature of this invention that means is provided for automatically moving the nozzle to adjust the spaced relation of the discharge end thereof from the bushing 20. To accomplish this result, there is provided an arm 35 which is fixed to the nozzle and which has a threaded end 36 engaged by the inner threaded hub 37 of a worm wheel 38. It will be understood that the worm wheel is suitably journalled for rotation, but is fixed against movement longitudinally of the arm 35 whereby upon rotation of the worm wheel the arm 35 and thus the nozzle is moved. A worm 39 driven by a motor 40 is provided for rotating the worm wheel 38.

As thus far described, it will be apparent that if tubing is being formed, the tubing designated by the reference character 45, will be drawn through the bushings in the sleeve 11 by suitable mechanism (not shown). Externally, the tubing will be shaped by the bushings 20 and 25, while the opening through the tubing will be formed by the air discharged by the nozzle 30.

It constitutes a feature of this invention that the size of the tubing or rod being formed will be accurately and automatically controlled. To accomplish this result there is disposed beyond the discharge end of the sleeve 13 a suitable gauging device designated generally by the reference character 50. This gauging device comprises a suitable light sensitive element, such, for example, as a photoelectric cell designated by the reference character 51. This light sensitive element is disposed on one side of the path of travel of the tubing 45, while disposed on the opposite side of the path of travel of the tubing is a source of light 52, which, through a suitable lens system (not shown), directs light rays toward the light sensitive element. The arrangement is such that the light sensitive element is partly shielded by the tubing 45 from the rays projected from the light source 52. This is diagrammatically illustrated in Fig. 2 of the drawings and by reference to this figure it will be apparent that if the external size of the tubing or rod becomes increased or decreased, the amount of light projected onto the light sensitive element will be correspondingly decreased or increased.

The light sensitive element is suitably interconnected with an amplifier 55 and an electromagnet 58, the arrangement being such that as the degree of illumination of the light sensitive element varies, the electromagnet will be actuated.

Adapted to be reciprocated by the solenoid or electromagnet 58, is a rod 60 and this rod is suitably connected to means adapted to control the speed of rotation of the sleeve 13, the supply of air to the mandrel or nozzle 30, the temperature of the bushings 12 and 20, and the spaced relation of the nozzle 30 from the bushing 20.

In order that reciprocation of the rod 60 may accomplish the above results, this rod is provided with a plurality of rack teeth designated by the reference characters 61, 62 and 63. The first gear segment 61 engages a pinion 64 which in turn controls a rheostat 65. This rheostat controls the flow of current through conductors 66 to the motor 16 which rotates the sleeve 13.

The second gear segment engages a pinion 68 which is arranged to control a rheostat 69, this rheostat controlling the flow of current through conductors 70 to suitable heating means associated with the bushings 12 and 20.

The third gear segment engages the pinion 34 which actuates the valve controlling the supply of air under pressure to the nozzle 30.

The motor 40 is a reversible motor and the direction of rotation of this motor is controlled by a pole changing switch 75 of standard construction. For actuating this switch there is fixed to the arm 60 an arm or bracket 77 which is suitably connected to the switch 75. Suitable means (not shown) are provided for normally maintaining switch 75 in a neutral or inoperative position, while additionally, provision is made for a limited movement of the arm 77 even after it has been moved sufficiently to actuate the switch.

With the apparatus as thus far described, it will be understood that glass drawn from the feeding chamber 10 will pass through the bushings 20 and 25 and will thus be externally formed to the size and shape desired. If the external shape of the rod or tubing is circular, the sleeve 13 together with the bushings 20 and 25 will be rotated whereas if the external shape of the rod or tubing is other than circular, the sleeve will preferably not be rotated.

Additionally, it will be understood that if glass rods are being formed, the nozzle 30 will not be utilized whereas if tubing is being formed this nozzle will be utilized to discharge air through the interior of the tubing to form the opening through the tubing in accordance with the usual practice. While in the diagrammatic showing of Fig. 1, the nozzle 30 is illustrated as not being adapted for rotation, it is to be understood that this nozzle may be constructed in any desired manner, or in the manner which will later be brought out so that it may rotate and that the speed of rotation of this nozzle may be controlled as will later be described.

If, for example, tubing is being formed, it will be understood that as this tubing leaves the sleeve 13, its external diameter will be gauged by the device 50. Should the external diameter of the tubing vary from that desired, the light sensitive element will, through the amplifier 55, effect an actuation of the electromagnet 58, thus longitudinally moving the rod 60. The arrangement is such that should the diameter of the tubing drop below the size desired, the rheostat 65 will be actuated to decrease the flow of current through conductors 66 and to thus decrease the speed of rotation of the sleeve 13 and the bushings 20 and 25. At the same time, the rheostat 69 will be actuated to decrease the flow of current to the heating elements associated with the bushings 12 and 20, thus lowering the temperature of these bushings and increasing the viscosity of the glass.

Additionally, the arm 60 moving toward the right will actuate pinion 34 to reduce the pressure of the air supplied to the nozzle 30 and will actuate switch 75 causing motor 40 to move the nozzle 30 further away from the inlet end of bushing 20. This will effect an immediate increase in the diameter of the tubing so that the tubing diameter will be brought back to that desired. Obviously, should the diameter of the tube increase beyond the limits desired, the reverse of the above operations will occur with the result that the diameter of the tubing will be decreased.

While the operation of the apparatus as thus far described has been described in connection with the forming of tubing of circular cross sectional area, it will be apparent that if tubing of non-circular cross sectional area is being produced, or if glass rods are being produced, either control of the motor 16 or the control of the nozzle 30 or both will be eliminated. The gauging device 50 being directly responsive to the cross sectional area of the tubing or rod being formed will function through the several controls which have been described to maintain the tubing or rod to the size desired.

Beyond the gauging device 50 the rod or tubing may, if desired, be subjected to the action of a further forming and shaping device designated generally by the reference character 80. As illustrated, this device may comprise a housing 81, the ends of which carry removable shaping and sizing bushings 82 and 83. It will be understood that the passages through these bushings correspond in size and shape to the size and shape desired in the finished rod or tubing, with the result that these bushings act to finally accurately shape the rod or tubing being formed.

The device 80 is preferably mounted for rotation and for movement toward and away from the sleeve 13 in any desired manner (not shown) and the rotative and longitudinal movements of the device may be controlled by the gauging device 50. Obviously, by varying the spaced relation of the device 80 from the sleeve 13, the temperature and thus the plasticity of the rod or tubing reaching the device 80 will be varied, while by rotating the device 80 the shaping bushings carried thereby prevent the tube from buckling. If it is desired that the rod or tube be colored, a suitable coloring material such as molten glass or the like may be discharged into the chamber 84, which is formed by the housing 81.

Finally, a gauging device 85, similar to that previously described, may be provided for finally gauging the rod or tubing, this final gauging device being adapted either to supplement the control of the prior gauging device or to terminate the operation of the apparatus in the event that the size of the rod or tubing varies too greatly from that desired.

As previously mentioned, it constitutes a feature of this invention that during a single day's operation, there may be produced from a single furnace, a plurality of rods and tubes differing in cross sectional size and shape. Heretofore, glass tube and rod manufacturing plants have been seriously handicapped in meeting sales demands. If the tube forming machine is set to form, for example, cylindrical tubing of a certain size, and an order is received for tubing of a different size or for glass rods, it has been necessary, if the desired rod or tubing is not in stock, to shut down the furnace, permit the forming mechanism to cool and to then replace the forming mechanism with a mechanism capable of forming rod or tubing of the size and shape desired and to then start up the actuation of the furnace to melt the glass therein.

The present invention contemplates the elimination of this disadvantage by associating a plurality of glass feeding chambers with a single furnace, whereby different sizes and shapes of glass rods or tubing may be simultaneously made from the glass melted in a single furnace or whereby, if desired, the operation of any one of the series of forming mechanisms utilized may be started or discontinued, as desired.

Referring then particularly to Figs. 3 and 4, the reference character 90 designates generally a glass furnace which may be of any desired character whatever. This furnace is preferably provided with a discharge throat or trough 91 adapted to discharge into a forebay 92 which is preferably located below throat 91 so that the glass drops from one to the other. The forebay 92 may, as illustrated, be semi-circular in horizontal cross sectional shape and may be provided with a plurality of feeding chambers 93 which project radially therefrom. A gate or valve (not shown) is preferably provided in the throat 91 whereby the supply of glass to the forebay may be conveniently controlled or cut off entirely, if desired.

By reference to Figs. 3 and 4, it will be noted that the flow of glass from the forebay to the feeding chambers is controlled by valves 95, there being one valve for each feeding chamber with the result that the supply of glass to any feeding chamber may be cut off, as desired. Additionally, each feeding chamber is provided with a drain plug 96 whereby it may be drained and with a gate 97 which controls the level of the glass in the forward end of the feeding chamber.

Thus during the operation of the apparatus any feeding chamber may be placed in operation or taken out of operation at the will of the operator and without necessitating the shutting down of the main furnace 90, or the draining of glass from the reservoir 92. Additionally, each gate 97 may be adjusted to vary the glass level in its respective feeding chamber and to thus adjust the pressure at which the glass is supplied to the shaping bushing. Preferably those portions of the throat 91, reservoir 92 and feeding chambers 93 which are contacted by the molten glass, as well as the valves 95, gates 97 and the nozzles and shaping bushings are either covered with or formed of a platinum or like metal or an alloy which is highly resistant to the abrasive action of molten glass. For example, if desired, an alloy containing from eighty to ninety per cent of platinum and the balance rhodium might be utilized. In this manner erosion of the several elements by the glass is eliminated so that the glass from which the rod or tubing is made will be free of foreign matter which might be worn from refractory walls.

Referring now to Fig. 4 it will be noted that the feeding chamber 93 is provided at its forward end with an outlet opening 11ª, in which is mounted a tapered metallic or alloy bushing 12ª, through which the glass passes to the shaping and sizing device, the same as in the first described form of the construction.

The numeral 13ª designates the rotatably mounted sleeve, this sleeve being provided with a gear 100 which is driven by a pinion 101, this pinion being in turn driven from the shaft 102 by means of the beveled gears 103 and 104. The motor 16ª for driving the shaft 102 is supported on a suitable standard 105, this standard likewise providing suitable bearings for the shaft 102 and the pinion shaft 106.

Figure 6:
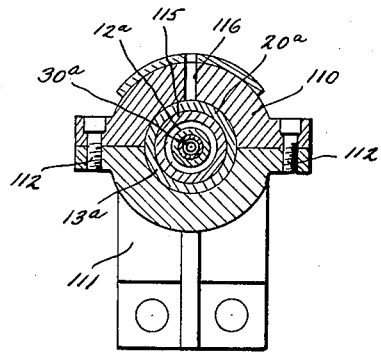
Fig. 6 is a fragmentary sectional view taken substantially on the line 6—6 of Fig. 4.

That end of the sleeve 13ª which is adjacent the feeding chamber is journalled in a bearing 110 which is supported from the feeding chamber by a suitable bracket 111. The bearing is preferably formed in half sections as illustrated, in Fig. 6, these half sections being secured together by bolts 112 whereby the bearing may be taken apart and the sleeve readily removed.

For journalling the lower end of the sleeve 13ª, there is provided a bearing 113, this bearing being similar to the bearing 110, and being carried by the standard 105. As illustrated, the hub of the gear 100 is journalled in the bearing 113 but it will be apparent that, if desired, the sleeve 13ª might be extended and be journalled in this bearing.

As in the first described form of construction, the sleeve carries bushings 20ª and 25ª, these bushings having passages 21ª and 26ª respectively, which aid in shaping the tubing or rod 45ª. As previously mentioned, these bushings may be formed of a suitable alloy which is entirely resistant to the abrasive action of glass or, if desired, the bushings may be provided with platinum linings, as designated by the reference character 115. It constitutes a feature of this construction that the bushings 20ª and 25ª may be fixed for rotation with the sleeve 13ª as by bolting them to the sleeve or gear 100 in the manner illustrated, or, if desired, the bushings may be fixed against rotation by bolting them to the adjacent bearings 110 or 113, suitable bolt holes 116 being provided for this purpose. Thus it will be apparent that the shaping and sizing bushings may either rotate with the sleeve 13ª or may be held against rotation, while still permitting the sleeve 13ª to rotate.

To provide for the flow of air through the sleeve in the direction of the travel of the rod or tubing therethrough, the sleeve is provided on its inner surface with spiral veins 120 which, when the sleeve rotates, act to create a movement of air in the direction of the length of the tubing and in the same direction as the tubing is being drawn. Additionally, the sleeve is preferably provided with louver openings 121 through which air may flow from a housing 122 which encloses the sleeve 13ª. This housing is secured to the bracket 110 so as to be fixed against rotation with the sleeve. Exteriorly of the housing 122, the sleeve is provided with openings 123 through which the air supplied to the interior of the sleeve may be discharged, while for supplying air to the interior of the housing 122, for flow therefrom into the sleeve, there may be provided an air supply pipe 124, which may terminate within the housing in a suitable annular nozzle 125. It might be noted at this time, that, if desired, suitable coloring material might be supplied to the interior of the housing 122 to color the rod or tubing as it passes through the sleeve 13ª.

As in the previously described form of construction, there is provided a mandrel or nozzle designated generally by the reference character 30ª, this nozzle being provided with the air discharge passage 31ª adapted to be supplied with air under pressure by a suitable flexible hose (not shown). The mandrel is journalled for rotation in a suitable bearing 130 which is carried by a bracket 131 having laterally extending flanges 132 mounted for sliding movement in suitable slideways 133, the latter being carried by the structural framework of the feeding chamber.

As in the first described embodiment of the invention, it is contemplated that the mandrel be moved toward and away from the bushing 20ª upon variations in the size of the tubing or rod being drawn, and to accomplish this, the rod 60ª is provided with rack teeth 135, which drives gears 136 and 137, the latter engaging a rack 138 formed on the bracket 131. It will be noted that this construction takes the place of the electric motor 40 previously described, and provides that upon movement of the rod 60ª to the right as viewed in Fig. 4, the mandrel will be moved away from the bushing 20ª.

For the purpose of rotating the mandrel, there is fixed to the same a worm wheel 140 driven by a worm 141 mounted on a shaft 142. The shaft 142 may be driven from an electric motor 143 through the bevel gears 144 and 145. While the motor 143 is shown as being carried by the bracket 131, it will be apparent that, if desired, the motor may be provided with a flexible shaft arranged to drive the bevel gear 144.

As previously mentioned, it constitutes a feature of this invention that nozzles of different size and shape may be substituted the one for the other and it will be apparent that with the construction as thus far described, this may be accomplished by sliding the bracket 131 upwardly out of the slideways 133, and by then removing the nozzle from its bearing 130 by first removing the nut 150 which is threaded on the mandrel body at one side of the bearing 130. Thus the nozzle is mounted not only for rotation and for movement toward and away from the first sizing and shaping bushing, but is also adapted to be readily removed from its bearing so that a nozzle differing in size or shape may be placed in operation.

Beyond the lower end of the sleeve 13ª there is provided a gauging device 50ª similar in all respects to the gauging device described in connection with Fig. 1. Beyond this gauging device there is provided a further shaping and sizing device 80ª. It will be noted that this device is mounted both for rotation and for movement toward and away from the adjacent end of the sleeve 13ª.

To provide for the movement of the device 80ª, the housing 81ª thereof is journalled in suitable bearings 155. These bearings are formed in the legs 156 of a substantially U-shaped member, the base 157 of which carries a motor 158 which drives a worm wheel 159 which is in engagement with a worm 160, fixed to the housing 81ª.

For the purpose of supplying coloring material or the like to the chamber 84ª within the housing 81ª, the housing is provided with suitable openings 161 which register with an annular housing 162, in which the housing 81ª is mounted for rotation. The desired material is supplied to the annular housing 162 by a supply pipe 163.

For the purpose of moving the device 80ª toward and away from the sleeve 13ª, there is provided a motor 165 which drives a pinion 166 in engagement with a rack 167 formed on the underface of the member 157. The members 156 in which the bearings 155 are formed are mounted for sliding movement by virtue of laterally extending flanges 168 which are engageable in slideways 169 formed in the legs 170 of a U-shaped support designated generally by the reference character 171.

Beyond the device 80ª there is provided a final gauging device 85ª, which operates in a manner similar to the device 85 previously described.

It will be understood that the gauging device 50ª is arranged as in the manner previously described, to reciprocate the rod 60ª. This rod carries suitable rack teeth (not shown) which actuate rheostats also not shown for controlling the flow of current to the wires 66ª which lead to the motor 16ª and also the flow of current to wires 70ª which lead to the bushings 12ª and 20ª, for heating the latter. Thus as described in connection with the embodiment of the invention shown in Fig. 1, when the rod 60ª is reciprocated, the speed of rotation of the sleeve 13ª will be varied as will also the temperature of the bushings 12ª and 20ª. As also previously described, the rod 60ª has rack teeth 63ª arranged to actuate pinion 34ª, which in turn actuates the valve which controls the supply of air to the mandrel 30ª.

In addition to the above controls which were effected by the rod 60 in the embodiment of the invention shown in Fig. 1, the rod 60ª is also adapted to control the speed of rotation of housing 81ª, the movement of this housing toward and away from sleeve 13ª, and the speed of rotation of the mandrel 30ª. Thus rod 60ª is provided with rack teeth 175 arranged to actuate a rheostat 176 which controls the flow of electric current to motor 158, so that upon reciprocation of rod 60ª, the speed of rotation of housing 81ª and its associated bushings will be varied.

The motor 165 which is arranged to move the device 80ª is a reversible motor and is adapted to be controlled by a pole changing switch 180 which is of standard construction and similar to the switch 75. Fixed to the arm 60ª is an arm or bracket 182 which is arranged to actuate the switch 180 in the same manner as arm 77 actuates switch 75.

For the purpose of controlling the speed of rotation of the mandrel, the rod 60ª is provided with rack teeth 185 which actuate a rheostat 186 and this rheostat controls the support of electric current to the motor 143 which rotates the mandrel.

It is believed that the operation of the embodiment of the invention shown in Figs. 3 through 7 inclusive will be apparent when considered in connection with the description of the operation of the embodiment shown in Fig. 1. If the diameter of the tubing falls below the size desired, the rod 60ª will be automatically actuated to decrease the speed of rotation of the sleeve 13ª and thus of the bushings 20ª and 25ª; to decrease the flow of current to the bushings 12ª and 20ª thus lowering the temperature of these bushings and increasing the viscosity of the glass; to reduce the pressure of the air supplied to the nozzle 30ª and to move the nozzle 30ª further away from the inlet end of the bushing 20ª. Additionally, this movement of rod 60ª will actuate rheostat 186, to decrease the speed of rotation of the mandrel; will actuate rheostat 176 to decrease the speed of rotation of the housing 81ª and its associated bushings and will actuate switch 180 so that the device 80ª will be moved closer to the sleeve 13ª. This will effect an increase in the diameter of the tubing so that the tubing diameter will be brought back to that desired.

In passing through the device 81ª, the rod or tubing is subjected to the final sizing and gauging actions of the bushings 82ª and 83ª and may also be colored, if desired, by admitting a suitable coloring material to the chamber 84ª. The rod or tubing is then again gauged by the device 85ª which may be arranged to terminate the actuation of the apparatus in the event the tubing size varies too greatly from that desired, or which may be arranged to modify the effective actuation of the means controlled by the gauging device 50.

Figure 8:
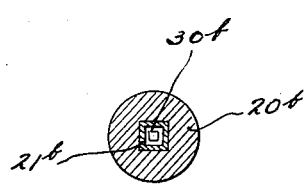
Fig. 8 is a view similar to Fig. 6 showing a different shape which the forming mechanism may assume.

In Fig. 8, there is diagrammatically illustrated a modified form of bushing 20b in which the passage 21b therethrough is square rather than round. It will be noted, however, that also in this case the end of the nozzle 30b is preferably slightly smaller than the cross sectional area of the passage 21b.

In Fig. 9 a further modification of the inventive idea is disclosed in which the sleeve 13 and spaced bushings 20 and 25 are eliminated and there is substituted therefore an elongated conically shaped bushing or shaping device designated by the reference character 200. It will be noted that the glass drawn from the fixed bushing 12c enters the larger end of the member 200 and in being drawn through the same is accurately sized and shaped so that when the rod or tubing leaves the discharge end 201 of the member 200, it is of the size and shape desired. The member 200 is mounted for rotation in a manner similar to the sleeve 13ª, and additionally, this member is preferably provided with openings 202 so that air supplied to the interior of housing 122c may act on the rod or tubing being drawn to properly control the temperature thereof. If desired, the member 200 may be electrically heated in the same manner as member 20.

From the above it will be apparent that the invention provides means whereby from a single furnace a series of tubes or rods of various cross sectional sizes and shapes may be simultaneously produced. Additionally, the supply of glass to each feeding chamber may be cut off whenever desired, and the forming mechanism associated therewith may be changed to produce rod or tubing differing in size and shape from that previously formed.

When tubing or rod circular in cross section are being produced, the several forming bushings are preferably rotated, although it is to be noted that it is not essential that these bushings be rotated. Additionally, it is possible with the construction disclosed in Fig. 4 to have the bushing 20ᵃ rotate with the sleeve 13ᵃ, while holding the bushing 25ᵃ stationary, if such an operation is desired. Obviously, when rods or tubing having cross sectional shapes other than circular are being produced, the several shaping and sizing bushings are held stationary.

The discharge end of the nozzle is preferably slightly smaller than the inlet end of the first shaping and sizing bushing and additionally, the nozzle is so mounted that it may be readily removed and replaced by a nozzle of a different size and shape. The bushings 20ᵃ and 25ᵃ may likewise be readily removed and other bushings substituted for the same by virtue of the split bearings in which these bushings are located. The final shaping and sizing bushings 82ᵃ and 83ᵃ are likewise adapted to be readily removed from the device 80ᵃ with the result that by suitably changing the bushings and the nozzle, tubing or rod of any desired size and shape may be produced.

It might be noted in speaking of substituting one series of bushings for another, it is meant that the bushings will have different sized or shaped passages through them. In other words, it is a feature of this apparatus, that externally the bushings are of the same size and shape so that the elements in which they are mounted need not be changed when it is desired to change the size or shape of the tubing being formed.

The electrical connections to the bushings 12ᵃ and 20ᵃ permit an accurate control of the viscosity of the glass and thus assist materially in regulating the diameter of the rod or tubing being drawn. Additionally, the electrical connections to the bushings 20 provide a means whereby the so-called wetting characteristics of the bushing may be controlled and in this manner the smoothness and polish of the rod or tubing being drawn may be regulated.

The fact that the bushings are formed of an alloy which is highly resistant to the abrasive action of molten glass, or are lined with such an alloy, prevent the mechanical variations in tube diameters which are usually encountered in the use of bushings formed of clay or common metals.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. The method of forming glass tubes or rods which consists in drawing the glass from a suitable source, imparting the desired external size and shape to the glass as it is withdrawn from the source, gauging the size of the tube or rod being drawn, and adjusting the temperature of the sizing and shaping means upon variations in the size of the rod or tubing from a predetermined desired size.

2. The method of forming glass tubes which consists in drawing the glass from a suitable source, initially shaping the glass as it is withdrawn from the source, rotating the shaping means, discharging air through the center of the glass being drawn, gauging the size of the tube being drawn, and controlling the pressure of the air supplied to the interior of the tube in dependence upon the actuation of the gauging means.

3. The method of forming glass tubes which consists in drawing the glass from a suitable source, sizing and shaping the glass as it is withdrawn from said source, rotating the sizing and shaping means, discharging air under pressure through the center of the glass being drawn, gauging the size of the tube being drawn, and varying the speed of rotation of the sizing and shaping means and the pressure of the air supplied to the interior of the tube upon variations in the size of the tubing from a predetermined desired size.

4. In an apparatus of the class described, a shaping bushing through which the glass is drawn, a feeding chamber for feeding molten glass into the bushing, and means including a light sensitive element for gauging the size of the tube or rod drawn through the bushing.

5. In an apparatus of the class described, a shaping bushing through which the glass is drawn, a feeding chamber for feeding molten glass into the bushing, a second bushing spaced from the first mentioned bushing adapted to engage the glass being drawn to shape the same, a sleeve carrying both of said bushings, and means including a light sensitive element for gauging the size of the tube or rod being drawn after it has passed through said second mentioned bushing.

6. In an apparatus of the class described, a shaping bushing through which the glass is drawn, a nozzle for discharging air centrally through said bushing, a gauging device for gauging the external size of the tubing drawn through the bushing, and means controlled by said gauging device for regulating the pressure of the air discharged through the bushing by the nozzle.

7. In an apparatus for forming glass tubing, a pair of spaced shaping and sizing bushings through which the glass is adapted to be drawn, means for feeding molten glass to one of said bushings, a sleeve mounting said bushings, means for rotating said sleeve, a nozzle for discharging air through the bushing to which the glass is initially supplied, a device for gauging the size of the tubing which is formed, and means controlled by said gauging device for controlling the speed of rotation of the sleeve, the spaced relation of the nozzle to the bushing adjacent which it is located, and the pressure of the air discharged by the nozzle.

8. In a machine for forming glass rods or tubes, a shaping and sizing bushing through which the glass rod or tubing is drawn, means for feeding molten glass into said bushing, means for heating the bushing, a device for gauging the size of the rod or tubing after it passes through said bushing, and means controlled by said gauging device for controlling the temperature of said bushing.

9. In an apparatus for forming glass tubes or rods, a plurality of spaced shaping and sizing bushings through which the glass to be shaped is drawn, means for feeding molten glass to one of said bushings, means for gauging the external size of the rod or tubing shaped by said bushings, and means for discharging a coloring agent into contact with the rod or tubing after it has been sized and shaped by the said bushings.

10. In an apparatus of the class described, a sleeve mounted for rotation, shaping and sizing bushings removably carried by the opposite ends of said sleeve, means for feeding molten glass into one of said bushings, means for drawing the glass through the bushing into which it is fed and through the other bushing, and means for supplying cooling air to the interior of said sleeve.

11. In an apparatus of the class described, a sleeve mounted for rotation, said sleeve being provided in its sides with louver openings, shaping and sizing bushings removably mounted in opposite ends of said sleeve through which the glass to be shaped is drawn, and means for discharging cooling air into said sleeve through said louver openings.

12. In an apparatus of the class described, a feeding chamber for molten glass, a bushing having a sizing and shaping passage through which tubing to be shaped is drawn, means mounting said bushing at an inclination to the horizontal, a nozzle arranged to discharge air under pressure into the passage through the bushing, a gauging device for gauging the size of the tubing drawn through the bushing, and means controlled by said gauging device for adjusting the nozzle toward and away from the inlet end of the bushing.

13. In an apparatus for forming glass tubes or rods, a feeding chamber having a discharge opening through which the molten glass is drawn, a bushing defining the discharge opening in the feeding chamber, a device for gauging the size of the tubing or rod drawn through the bushing, and means controlled by said gauging device for controlling the temperature of said bushing to thus control the viscosity of the glass as it leaves the feeding chamber.

14. In an apparatus of the class described, a feeding chamber for molten glass, a series of spaced sizing and shaping bushings through which the glass is drawn, means for gauging the size of the rod or tubing drawn through said bushings, means for rotating the bushings, and means controlled by the gauging means for varying the speed of rotation of said bushings.

15. In an apparatus of the class described, a sleeve mounted for rotation, shaping and sizing bushings removably carried by said sleeve through which the glass to be shaped is drawn, means for providing for the supply of air to the interior of the sleeve, and spiral veins disposed within the sleeve adapted upon rotation of the sleeve to create a movement of the air therein in the direction of travel of the rod or tubing drawn through the sleeve.

16. In an apparatus for forming glass tubing, a feeding chamber from which the glass tubing is drawn, a nozzle for discharging a fluid under pressure centrally through the tubing being drawn, a gauging device for gauging the external size of the tubing being drawn, and means controlled by the gauging device for regulating the pressure of the fluid discharged by the nozzle.

17. In an apparatus for forming glass tubes or rods, a feeding chamber from which the glass tubes or rods are drawn, a second chamber through which the rod or tubing passes, and means for discharging a coloring agent into the second chamber into contact with the rod or tubes drawn therethrough.

RANDOLPH H. BARNARD.